United States Patent Office 2,731,453
Patented Jan. 17, 1956

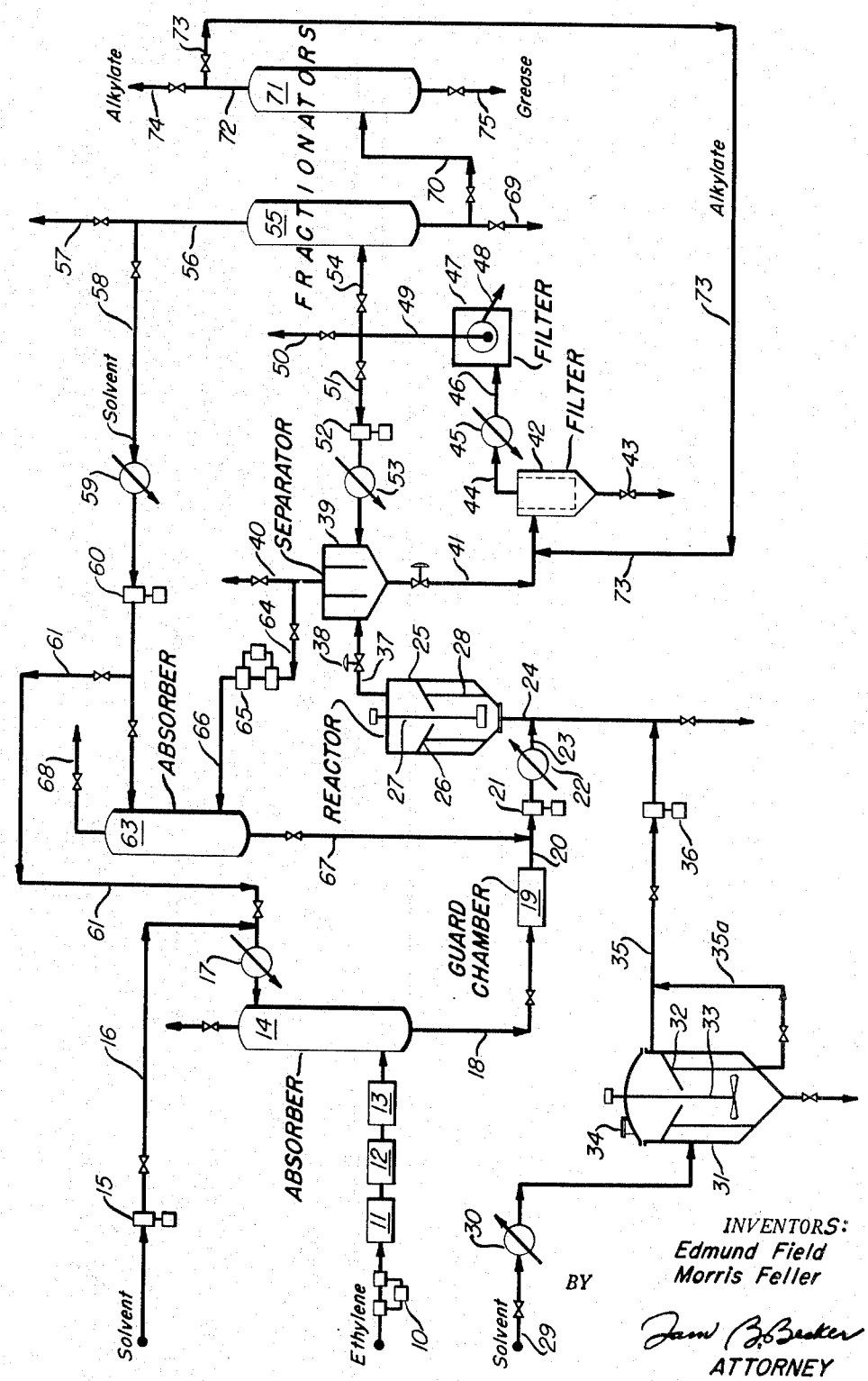

2,731,453

CONVERSION OF ETHYLENE AND PROPYLENE TO SOLID POLYMERS WITH GROUP 6a METAL OXIDES AND COMPLEX METAL ALUMINUM HYDRIDE CATALYSTS

Edmund Field and Morris Feller, Chicago, Ill., assignors to Standard Oil Company, Chicago, Ill., a corporation of Indiana Application December 6, 1952, Serial No. 324,608

15 Claims. (Cl. 260—88.1)

This invention relates to a novel polymerization process. In a more specific aspect, this invention relates to a novel process for the polymerization of ethylene, propylene or their mixtures by contact with a catalytic mixture prepared by admixing an alkali metal aluminum hydride having the general formula $MAlH_4$, wherein M represents an alkali metal with a solid catalytic material containing an oxide of a metal of group 6a (left hand subgroup of group 6) of the Mendeleeff Periodic Table, viz., one or more of the oxides of Cr, Mo, W or U.

One object of our invention is to provide novel and highly useful catalysts for the preparation of high molecular weight polymers from ethylene-containing gas mixtures. Another object is to provide a process of ethylene polymerization in which the yields of solid polymer are greatly increased, as compared with the yields heretofore obtainable solely by the use of subhexavalent molybdena catalysts and similar catalysts. Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials to provide novel resinous materials. Yet another object of our invention is to provide a process for the preparation of solid, elastic polymers from propylene. These and other objects of our invention will become apparent from the ensuing description thereof.

Briefly, the inventive process comprises the conversion of ethylene, propylene or their mixtures principally to high molecular weight normally solid, resinous polymers by contact with a catalytic material prepared from a group 6a metal oxide, preferably supported on a difficultly reducible metal oxide, and a metal hydride having the formula $MAlH_4$, wherein M represents an alkali metal. The inventive process is effected at temperatures between about 130° C. and about 325° C., preferably between about 180° C. and 260° C. and pressures between about atmospheric and 15,000 p. s. i. g. or higher, preferably between about 200 and 5000, or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. For the polymerization of propylene, less readily alkylatable reaction media such as cycloparaffins, e. g., cyclohexane or decalin, or paraffins, e. g., iso-octane, are preferred. The conversion of ethylene or propylene can be effected in the absence of of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough, resinous ethylene homopolymers having an approximate specific viscosity ($\times 10^5$) of 10,000 to more than 300,000 [($\eta$ relative $-1) \times 10^5$]. By the term "tough, resinous polyethylene" as used in the present specification and claims, we mean polymer having a brittle point below $-50°$ C.( A. S. T. M. method D746–51T), impact strength greater than two foot pounds per inch of notch (A. S. T. M. method D256–47T—Izod machine) and minimum elongation at room temperature (25° C.) of 100%.

The process of the present invention can be employed to effect the copolymerization of ethylene with other polymerizable materials, e. g. propylene. The molar ratio of ethylene to propylene may be between about 0.1 and about 10. Propylene alone may be polymerized, by the employment of the catalysts of the present invention, to rubber-like polymers, in addition to oils and grease-like solids. Other polymerizable materials include mono-olefinic hydrocarbons such as n-butylenes, isobutylene, t-butylethylene, and the like, usually in proportions between about 1 and about 25 percent by volume based on the volume of ethylene.

An important feature of the present invention is the employment of a catalyst prepared from molybdena-containing catalyst and a complex metal hydride having the formula $MAlH_4$, wherein M represents an alkali metal, viz., lithium, sodium, potassium, rubidium or cesium. We may also employ mixtures of said metal hydrides. The employment of said metal hydride has numerous important practical consequences, as compared to processes wherein said metal oxide catalysts are employed alone. Thus, in the presence of a catalyst prepared from $MAlH_4$ and a group 6a metal oxide, high yields of solid polymers can be obtained from ethylene, the metal oxide-containing catalyst functions well in the presence of large proportions of liquid reaction medium, the metal oxide-containing catalyst retains strong polymerization activity for a long period of time (long catalyst life), polymers having desirable ranges of physical and chemical properties can be readily produced by controlling the reaction variables, etc., as will appear from the detailed description and operating examples which follow.

The alkali metal aluminum hydrides may be prepared by the reaction of the desired alkali metal hydride with $AlCl_3$, usually under vacuum or under an inert gas blanket (to prevent access of moisture, $CO_2$ or oxygen) and in the presence of a solvent for the said hydrides in which the alkali metal chloride produced by the reaction is insoluble:

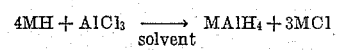

wherein M represents an alkali metal. The solvent is then removed from the MAlH₄ by conventional means, usually low pressure distillation.

The function or functions of the metal hydride in our process are not understood. The metal hydrides alone are not catalysts for the polymerization of ethylene or propylene to yield high molecular weight, normally solid polymers under the conditions described herein. Yet, the metal hydrides promote the action of the group 6a metal oxide catalysts to increase the productivity (polymer yield) of said catalysts, sometimes prodigiously. It might be assumed that the complex metal hydrides function merely to react with catalyst poisons which might be present in small proportions of the order of a few parts per million in ethylene, propylene and/or in the liquid reaction medium; we have found, however, that even extremely pure ethylene or propylene and liquid reaction medium which have been contacted with alkali metal or said metal hydrides under reaction conditions and directly thereafter contacted in a separate zone with a molybdenum oxide catalyst, do not produce solid polymer in the high yields or quality which can be attained by the process of the present invention.

We have found that ethylene can be converted to normally solid polymers by contacting it with the claimed catalysts without the necessity of a deliberate pre-reduction step, which is essential when group 6a metal oxides are employed as the sole catalysts. Prior to our invention, subhexavalent molybdenum oxides were known to be catalysts for the polymerization of ethylene to form normally-solid polymers only when supported upon the three difficultly reducible metal oxides; gamma-alumina, titania, zirconia. In the presence of the claimed metal hydrides, the group 6a metal oxide catalysts can be employed not only on alumina, titania or zirconia, but also on other supports for the polymerization of ethylene and/or propylene to form normally solid polymers, e. g., silica supports such as silica gel, kieselguhr, diatomite; silica-alumina, alumino-silicates, such as various clays and bleaching earths; and even adsorptive carbon, which is however not preferred. In a practical process, it is preferable to furnish a difficultly reducible metal oxide support for the group 6a metal oxide catalyst, e. g. gamma-alumina.

The proportion of alkali metal aluminum hydride which is employed can be varied from about 0.001 to about 2 parts by weight per part by weight of group 6a metal oxide catalyst (total weight of solid catalyst), usually between about .05 and about .5 part by weight. The optimum proportions can readily be determined in specific instances, by simple small-scale tests with the specific feed stocks, liquid reaction medium, reaction medium: catalyst ratio, catalyst, temperature, pressure and nature of the product which is desired. Usually LiAlH₄ is employed in proportions between about 0.05 and about 0.5 part by weight per part by weight of molybdena catalyst at ratios between about 5 and about 2000 volumes of liquid reaction medium per part by weight of molybdena catalyst.

The relative proportions of difficultly reducible metal oxide support to the catalytic metal oxide is not critical and may be varied throughout a relatively wide range such that each component is present in amounts of at least approximately 1 weight percent. The usual metal oxide support ratios are in the range of about 1:20 to 1:1, or approximately 1:10. We may employ conditioned alumina-metal oxide catalysts composed of gamma-alumina base containing about 1 to 80%, preferably about 5 to 35%, or approximately 10%, of catalytic metal oxide supported thereon.

Gamma-alumina, titania and zirconia supports for our catalysts may be prepared in any known manner and the oxides of molybdenum or other group 6a metal may likewise be incorporated in, or deposited on, the base in any known manner, e. g. as described in copending Serial No. 223,641 of Alex Zletz (now U. S. Patent 2,692,257) and Serial No. 223,643 of Alan K. Roebuck and Alex Zletz (now U. S. Patent 2,692,258), both filed on April 28, 1951. Excellent results have been obtained with metal oxide catalysts of the type conventionally employed for effecting commercial hydroforming, the word "hydroforming" being employed to mean processes of the type described in U. S. Letters Patent 2,320,147, 2,388,536, 2,357,332, etc.

The molybdena or other molybdenum-oxygen compound, such as cobalt molybdate, may be incorporated in the catalyst base in any known manner, e. g. by impregnation, coprecipitation, co-gelling, and/or absorption, and the catalyst base and/or finished catalyst may be heat stabilized in the known manners heretofore employed in the preparation of hydroforming or hydrofining catalysts. Cobalt molybdate catalysts may be prepared as described in U. S. 2,393,288, 2,486,361, etc. Cobalt, calcium, nickel and copper salts of chromic, tungstic and uranic acids may also be employed, with or without a support.

The catalyst may be stabilized with silica (U. S. 2,437,532–3) or with aluminum ortho-phosphate (U. S. 2,440,236 and 2,441,297) or other known stabilizers or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531–2). Oxides of other metals such as magnesium, nickel, zinc, chromium, vanadium, thorium, iron, etc., may be present in minor amounts, below 10 weight percent of the total catalyst.

Although, as stated above, no reducing treatment need be effected on MoO₃ catalysts when they are employed in the presence of alkali metal aluminum hydrides, a reducing or conditioning treatment is preferred in commercial processing. The conditioning or reducing treatment of the hexavalent group 6a metal trioxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressures in the reduction or conditioning operation may be varied from subatmospheric pressures, for example even 0.1 pound (absolute) to relatively high pressures up to 3000 p. s. i. g., or even more. The simplest reducing operation may be effected with hydrogen simply at about atmospheric pressure.

Lithium aluminum hydride, an exceptionally active reducing agent, conditions and activates catalysts containing hexavalent group 6a metal oxides even at temperatures as low as 35° C., although in general temperatures between about 100° C. and about 300° C. can be employed. In practice, for example, a catalyst containing free or chemically combined group 6a metal trioxide is treated with a suspension of LiAlH₄ in a liquid hydrocarbon solvent at weight ratios of about 0.01 to about 1 LiAlH₄ per weight of solid catalyst. Sodium hydride (or sodium plus H₂) is effective in reducing and conditioning hexavalent group 6a catalysts such as MoO₃ at temperatures above about 180° C. and can be employed in the same proportions as LiAlH₄.

The conditioning and reducing treatment of the group 6a metal oxide can be followed and controlled by analysis with ceric sulfate-sulfuric acid solution, by means of which the average valence state of the molybdenum or other metal oxide in the catalyst can be accurately determined. In determining the average valence state of metals such as molybdenum in catalysts such as partially reduced MoO₃ supported on difficultly reducible metal oxides such as gamma-alumina, it is necessary to know the total molybdenum content and the number of milliequivalents of a standard oxidation reagent required to reoxidize the partially reduced molybdena to $MoO_3$. A suitable oxidation procedure consists in weighing out approximately one gram of finely-ground, freshly-reduced catalyst into a glass-stoppered 250-ml. Erlenmeyer flask and adding 25 ml. of 0.1 N ceric sulfate solution and 25 ml. of 1:1 sulfuric acid. This mixture is allowed to stand at room temperature for four days with frequent agitation. This interval was arbitrarily chosen initially but was later shown to be more than sufficient time for the oxidation to take place. The solid residue is then filtered off and the excess ceric solution determined by addition of excess standard ferrous solution which is in turn titrated with standard ceric solution using ferrous-orthophenanthroline as the indicator. Total molybdenum in the sample is determined by dissolving the sample in a sulfuric acid-phosphoric acid solution, reducing the molybdenum in a Jones reductor, catching the reduced solution in ferric alum, and titrating the resulting ferrous ion with standard ceric sulfate solution. From the values obtained, the average oxidation state of molybdenum can be determined.

The partial reduction of the molybdena or other group 6a metal trioxide is carried out to the extent that the average valence state of the catalytic metal in the catalyst lies within the range of about 5.5 to about 2.0, preferably between about 3 and about 5.0.

The conditioning treatment hereinabove described is desirable not only for fresh catalyst, but also for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salt solutions, or dilute aqueous acids, thereafter burning combustible deposits therefrom with oxygen followed by the conditioning step. Detoxification of the catalysts by treatment with dilute aqueous solutions of per-acids such as permolybdic, pervanadic or pertungstic acids may be practiced, followed by hydrogen-conditioning of the catalysts.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products.

It is desirable to minimize or avoid the introduction of oxygen, carbon dioxide, water or sulfur compounds into contact with the catalyst.

In general, polymerization can be effected in the present process at temperatures between about 130 and about 325° C. Increasing the polymerization temperature tends to reduce the average molecular weight and density of the polymer produced by the process. Usually polymerization is effected in the present process at temperatures between about 180° C. and about 260° C. or the preferred narrower range of about 230° C. to about 250° C. The conjoint use of polymerization temperatures between about 230° C. and about 250° C. and a liquid hydrocarbon reaction medium such as benzene, xylenes, decalin, or methyl decalins is highly desirable in producing ethylene polymers having specific viscosities ($\times 10^5$) ranging on the average from about 10,000 to about 30,000 in continuous operations with relatively long on-stream periods and clean catalysts.

It has been found that the present process can be employed for the production of relatively high molecular weight ethylene or propylene hetero- and homo-polymers at relatively low pressures. The process of the present invention can be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene, xylenes or tetralin, or a cycloaliphatic hydrocarbon, such as decalin (decahydronaphthalene). The amount of ethylene or propylene in such solutions may be in the range of about 2 to 50% by weight, preferably about 2 to about 10 weight percent or, for example, about 5 to 10 weight percent. We have observed that when the ethylene concentration in the liquid reaction medium is decreased below about 2 weight percent, the molecular weight and melt viscosity of the polymeric products drop sharply. The rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, the resultant solutions of ethylene polymer in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between one-half and about 10 hours, usually between about 1 and about 4 hours, are employed and the reaction autoclave is charged with olefin as the pressure falls as a result of the olefin conversion reaction.

The solvent:catalyst weight ratio can be varied in the range of about 5 to about 3000, or even higher for flow systems. The employment of high solvent:catalyst ratios, which is rendered possible by the presence of an alkali metal aluminum hydride in the reaction zone, is very important in obtaining high yields of polymer.

The olefin charging stocks can be polymerized in the gas phase and in the absence of a liquid reaction medium by contact with catalysts produced by admixing an alkali metal aluminum hydride and molybdena or other group 6a catalysts. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is desirable to effect the conversion of the olefin in the presence of suitable liquid reaction media. The liquid reaction medium may also be employed as a means of contacting the olefin with catalyst by preparing a solution of the olefin feed stock in the liquid reaction medium and contacting the resultant solution with the polymerization catalyst.

The liquid reaction medium functions as a solvent for the olefin to bring the olefin into the necessary contact with the catalyst surface and/or growing olefin polymer chain. The medium dissolves some of the normally solid product from the catalyst surface.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid treatment, e. g., with anhydrous p-toluenesulfonic acid, sulfuric acid, phosphoric acid or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of $MoO_3$—$Al_2O_3$ catalyst and $LiAlH_4$ (50 cc. xylene-1 g. catalyst-0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances the solvent may be present as a dense gas phase.

When solvents such as xylenes are employed some slight alkylation thereof by ethylene can occur under the reaction conditions. Propylene is a far more reactive alkylating agent than ethylene and when propylene is present in the feed, it is desirable to employ a non-alkylatable solvent such as decalin. The alkylate is removed with grease in the present process, can be separated therefrom by fractional distillation and can, if desired, be returned to the polymerization zone.

An illustrative flow diagram indicating one method by which the process of our invention may be effected is set forth in the accompanying figure. The olefinic charging stock, e. g., ethylene or an ethylene-propylene mixture, is passed through compressor 10 wherein the pressure thereof is raised to a suitable value, for example, between about 500 and 2000 pounds, thence into chamber 11, which is provided with a suitable deoxygenating agent such as metallic copper at 150° C., then into chamber 12 which is provided with a dehydrating agent such as adsorptive alumina, anhydrous calcium sulfate, silica gel or equivalent drying reagents. The dried charging stock is passed from chamber 12 into chamber 13 wherein carbon dioxide is removed from the charging stock. Chamber 13 is provided with a suitable reagent, for example, sodium hydroxide deposited upon asbestos or with any other efficacious decarbonating reagent. The charging stock thus purified usually contains less than 50 parts per million of oxygen and has a dew point below −45° C. The charging stock is then passed into an absorber 14, wherein it meets a counterflow of solvent. Solvent or liquid reaction medium may be charged to the absorber and to the process by pump 15 through valved line 16 and heat exchanger 17, wherein it is brought to a suitable temperature for absorption, usually between about 15° C. and about 35° C.; recycle solvent from line 61 may also be charged to the absorber or may be the sole absorption medium employed. In absorber 14 a solution containing between about 2 and about 30 percent olefin, e. g. about 7 weight percent ethylene, is produced and is withdrawn through valved line 18 into a guard chamber 19 for final purification. The guard chamber may contain an active metal or metal hydride, for example, sodium or other alkali metal, an alkaline earth metal, an alkali metal hydride or an alkaline earth metal hydride. The guard chamber may be filled with calcium hydride. The guard chamber may be operated at temperatures between about 100° C. and about 280° C. If the feed stock is of sufficient purity, the guard chamber may be by-passed (by lines not shown) and introduced directly into reactor 25.

From guard chamber 19 the ethylene and solvent are discharged into line 20, thence through pump 21 into heater 22 wherein they are brought to the polymerization temperature, for example, between about 200 and about 275° C. From heater 22 the charge is passed through line 23, thence through line 24 into the lower end of reaction chamber 25. While a variety of suitable reactors can be employed, in the accompanying figure there is illustrated and autoclave divided into upper and lower sections by baffle 26. A stirring mechanism 27 projects into the lower portion of the reactor and suitable baffles 28 are provided at the walls. The stirring mechanism may be operated at about 20 to about 1000 R. P. M., e. g., about 650 R. P. M. It will be apparent, therefore, that a high degree of intermixing between the catalyst, alkali metal aluminum hydride, olefinic material and liquid reaction medium is achieved in the lower portion of reactor 25. Reactor 25 may be initially charged with the group 6a metal oxide catalyst and alkali metal aluminum hydride through lock hopper devices or equivalents, and further amounts of metal oxide catalyst and alkali metal aluminum hydride can be added intermittently during the course of the reaction, as desired, by suitable means.

If desired, a portion of the predried solvent can be passed through valved line 29 and heater 30, wherein it is brought to a temperature between about 150 and about 300° C., into a contacting chamber 31 provided with baffle 32, stirring mechanism 33 and an inlet 34 for alkali metal aluminum hydride. An intimate dispersion of metal hydride in solvent is formed in contactor 31 and is withdrawn from the upper quiescent zone by contactor 31 through valved line 35 into line 24, and is forced by pump 36 into reactor 25. An alternative and very useful method of purifying the solvent in contacting chamber 31 is to treat said solvent with an alkali metal hydride, usually NaH and a supported group 6a metal oxide, e. g. 10 weight percent $MoO_3$-gamma alumina, using about 3 to about 10 parts by weight of supported metal oxide per part by weight of alkali metal hydride, at a temperature between about 135° C. and about 270° C. and liquid hourly space velocities between about ½ and about 10.

In reactor 25, the polymerization of ethylene or propylene, or copolymerization of ethylene with other monomeric materials, is effected at suitable temperatures and pressures. The usual concentration of ethylene in the solvent entering the reactor is about 10 weight percent and the effluent from the reactor is usually a 2–5 weight percent solution of solid polymer in the solvent. When the preparation of a homopolymer of ethylene having a melt viscosity of $2 \times 10^5$ to about $5 \times 10^6$ poises is desired, the preferred temperatures are between about 230° C. and about 275° C. The reaction period can be varied between about 10 and about 100 minutes.

It will be understood that instead of one reactor we may employ a number of reactors in parallel or in series. When reactors are employed in series, variations in temperature and pressure, olefin concentration in solvent, and catalyst concentration become possible so that more control can be exerted over the average molecular weight and molecular weight range of the product, as well as of the extent of conversion in each stage. Also, through the employment of a number of manifolded reactors, suitable bypass lines and valves, it becomes possible to cut any reactor out of the system for purposes of cleaning and repair.

The upper portion of reactor 25 constitutes a quiescent settling zone wherein fine catalyst particles and metal hydride settle from the solution of polymer product in the reaction solvent and return under the force of gravity to the lower agitated portion of the reactor. The relatively clear solution of reaction products in solvent is withdrawn from the upper portion of reactor 25 through line 37 and expansion valve 38, wherein the pressure is allowed to fall to a value between about 15 and about 250 p. s. i. g. The product mixture is discharged from valve 38 tangentially into a separator, e. g., a cyclone-type separator 39, wherein a temperature of at least about 150° C. is maintained. Gas comprising a substantial proportion of ethylene in a poison-free condition is discharged from separator 39 through valved line 40. Hot solvent may be introduced into separator 39 through line 51 in order to prevent separation of polymer upon the walls of the separator.

In one preferred mode of operation, clear effluent from reactor 25 is bled through valve 38 down to the vapor pressure of the solvent, while maintaining the temperature in separator 39 at about 200° C. In this method of operation, essentially all the ethylene and a substantial proportion of the benzene are removed from the effluent of reactor 25 and can be recycled (by lines and a pump not shown) to said reactor. The relatively concentrated polymer solution can be treated as described hereinafter.

The solution of polymer in solvent (maximum of about 5 weight percent polymer) is withdrawn from separator 39 through valved line 41, into filter 42, wherein any fine catalyst particles which may have been carried along, are separated and withdrawn through valved line 43. If desired, the polymer solution may be subjected to the action of ultrasonic vibrators, which effect coagulation of the very fine catalyst particles so that they can be more readily filtered.

The solution of polymer product is withdrawn from filter 42 through line 44 into cooler 45, wherein its temperature is adjusted to a value between about 90° C. and about 20° C. and is then discharged through line 46 into filter 47. The solid polymer product is removed from filters 47 and 48 and the solvent or reaction medium is withdrawn through line 49, whence a portion can be discharged from the system through valved line 50, a portion can be passed through valved line 51, pump 52 and heater 53 into separator 39, and the remainder can be passed through valved line 54 into fractionator 55.

Precipitation of the polymer from the solution in line 44 can be induced by the addition of antisolvents such as low boiling hydrocarbons, e. g. propane, alcohols, ketones (acetone), etc. The polymeric product of the present process removed at 48 can be subjected to various treatments to prepare it for conversion to a finished industrial product. Thus, it may be subjected to various treatments to remove the imbibed solvent, it may be shredded or extruded to form string-like particles, dried, etc.

In fractionator 55, the solvent or liquid reaction medium is vaporized and passes overhead through line 56, whence a portion may be removed from the system through valved line 57, but is preferably passed through valved line 58 into cooler 59, wherein its temperature is brought to a value between about 20° C. and about 80° C., whence it is passed into pump 60. Pump 60 forces the solvent through valved line 61 and heat exchanger 17 into absorber 14 to prepare a solution of fresh olefin charging stock for the polymerization process. A portion of the solvent is also forced by pump 60 through valved line 62 into the upper portion of absorber 63. Recycled gases from separator 39 and line 40 are passed through valved line 64 and compressor 65 through line 66 into the lower portion of absorber 63, in which olefin is selectively absorbed in the solvent to produce a solution having a concentration between about 2 and about 10 weight percent of ethylene, which is discharged from absorber 63 through valved line 67 into line 20, whence it is passed to reactor 25. Unabsorbed gases are discharged from absorber 63 through valved line 68.

Liquid reaction products boiling above the boiling range of the solvent medium can be discharged from fractionator 55 and the process through valved line 69 but are preferably passed through valved line 70 into a second fractionator 71. A by-product of the present polymerization process produced in relatively small volume when an alkylatable aromatic hydrocarbon solvent such as a xylene is employed is an alkylate formed by reaction of said alkylatable aromatic hydrocarbon and ethylene (or propylene, when it is employed as a component of the charging stock). The alkylated aromatic hydrocarbon products are vaporized and fractionated in tower 71, from which they are discharged through line 72. It is usually desirable to recycle at least a portion of the alkylate through valved line 73 to line 41 for employment as a solvent in filter 42. The remainder of the alkylate may be discharged from the process through valved line 74 or may be recycled for employment as part of the liquid reaction medium in reactor 25.

Relatively small proportions of low molecular weight grease-like olefin polymers are produced in the polymerization process. The grease-like products are removed as a bottoms fraction from tower 71 through valved line 75.

An alternative method of operation following filtration of fine catalyst particles in filter 42 involves introduction of the dilute solution of ethylene or other olefin polymers in the reaction solvent, e. g., benzene, into a tower containing hot water or a mixture of liquid water and steam at a temperature sufficient to flash distil the solvent (or an azeotrope of solvent and water) from the solution and to produce a water slurry of the solid polymer containing about 1 to about 5 weight percent polymer. The aqueous slurry of polymer can be concentrated by conventional methods to yield a slurry containing about 10 to 15 weight percent polymer, which can thereafter be centrifuged to yield a polymer containing a minor proportion of water, which can be thoroughly dried in conventional equipment. The solvent passing overhead in the flash distillation operation can be condensed, separated from a lower liquid layer of water, re-distilled to further dry it and finally can be thoroughly dried with desiccants, e. g. silica gel or alumina gel, prior to recycle to storage or to the polymerization reaction zone.

Another alternative is to spray-dry the solution of polymer in aromatic solvent from which catalyst fines have been removed.

The following examples are presented for the purpose of illustrating but not unduly limiting the claimed invention. Unless otherwise indicated, the general procedure which was employed in batch operations was as follows. The molybdena-alumina catalysts were employed without prereduction (except in Examples 2, 13 and 14) and the average valence state of molybdenum in these catalysts before use was therefore +6. The reactions were carried out in pressure vessels provided with magnetically operated stirring mechanisms. The reactor was charged with the solvent and thereafter with the catalyst. When a pre-reduced group 6a metal oxide catalyst was employed, the gas space in the reactor was then blanketed with nitrogen. The hydride in powdered form was then added to the reaction vessel, whereupon the head was fitted while maintaining a flow of nitrogen to keep the system free of air. When unreduced catalyst was charged to the reaction vessel, it was simply poured in without the use of nitrogen. Residual air was flushed from the reaction vessel while pressure testing with hydrogen. The final component, the olefin, was charged to the reaction vessel after the latter had been heated to the reaction temperature. The magnetically-driven stirrup-type stirrer was alternately lifted and plunged down through the solution at a rate sufficient to keep the catalyst in suspension. The olefin feed was introduced from time to time during the course of the run in order to maintain the reaction pressure. A minor hydrogen partial pressure of the order of about 100–200 p. s. i. may be superimposed on the olefin partial pressure when the reaction fails to start readily. By plotting cumulative pressure drop against cumulative time, the progress of a run can be followed. In many cases much higher yields might have been obtained, had provision been made for the inclusion of a larger proportion of solvent in the reaction zone, since one of the reasons for run termination was jamming of the stirring mechanism due to the fact that the high molecular weight polymer was produced in the reaction zone in an amount exceeding its solubility in the liquid reaction medium under the reaction conditions.

In the examples, specific viscosity is (relative viscosity −1) and relative viscosity is the ratio of the time of efflux of a solution of 0.125 g. polymer in 100 cc. C. P. xylenes at 110° C. from the viscosimeter as compared with the time of efflux of 100 cc. of C. P. xylenes at 110° C. The melt viscosity was determined by the method of Dienes and Klemm, J. Appl. Phys. 17, 458–71 (1946).

To determine whether or not $LiAlH_4$ is itself a catalyst under the conditions we usually employ for the polymerization of ethylene, 1.0 g. of $LiAlH_4$ and 50 cc. benzene were charged to a reaction bomb. The bomb was heated to 130° C. and 900 p. s. i. of ethylene was charged to the bomb. The temperature was gradually increased to 175° C. at which point a definite pressure drop was obtained. No further pressure drop was obtained until the temperature was raised to 240–250° C. The rate of polymerization was rapid and increased linearly to a pressure drop of 1520 p. s. i. at which time the run was stopped. The run yielded 18.6 g. of products. The overall analysis of the products as determined by mass spectrometer and fractional distillation was as follows: $C_4$, 22%; $C_6$, 30%; $C_8$, 23%; $C_{10}$, 11%; $C_{12}$, 7%; $C_{14}$, 4%; $C_{16}+$, 3%. No solid polymer was formed. By infrared analysis the $C_4$ fraction was found to be butene-1.

The $C_6$ fraction was 3.6% hexanes and 96.4% hexenes. The latter were present in the proportion of 40% 1-hexene, 10% 2-ethyl-1-butene, and 50% 3-methyl-1-pentene. The $C_8$ fraction consisted of vinyl (octene-1) and branched terminal olefins.

$LiAlH_4$, (1.0 g.) and activated gamma-alumina (11.8 g.) were added to a reaction bomb, then 50 cc. of purified xylenes, the temperature was raised to 230° C. and ethylene was pressured into the reactor to an initial pressure of 900 p. s. i. g. During the reaction period, a pressure drop of 725 p. s. i. was observed. The reaction bomb was thereafter cooled and opened and it was found that no solid polymers had been produced but only some butenes and a small amount of grease-like ethylene polymers.

In runs carried out without any promoters, employing the general operating procedure above described, employing the 8 weight percent pre-reduced molybdena-gamma-alumina catalyst and a C. P. xylenes:catalyst ratio (ml./g.) of 5, only 0.5 g. per g. of catalyst of solid ethylene polymer were obtained at 230° C. and 1000 p. s. i. g. initial ethylene pressure.

Alkali metal aluminum hydride promoters permit the employment of very high solvent : catalyst ratios while maintaining relatively high polymerization rates, which in turn permits continuous processing and long catalyst life and also results in the production of much higher solid polyethylene yields per weight of metal oxide catalyst which is employed.

*Example 1*

A mixture of 0.5 g. of 8 weight percent molybdena-gamma-alumina catalyst (60–80 mesh/inch) and 0.1 g. of $LiAlH_4$, together with 50 ml. of xylenes, was placed in a 100 cc. reaction bomb which was then heated with stirring to a temperature of 222° C., whereupon purified ethylene was pressured into the bomb to an initial pressure of 900 p. s. i. g. After one hour of operation, hydrogen was pressured into the reactor to a partial pressure of 200 p. s. i. and reaction was continued for another hour by pressuring additional ethylene into the reactor. A total ethylene pressure drop of 1400 p. s. i. was observed. The operation yielded 4.28 grams per gram of catalyst of a tough, flexible ethylene polymer having a specific viscosity of $\times 10^5$ of 22,400 and a methylene:methyl ratio greater than 60.

*Example 2*

A completely spent 8 weight percent molybdena-gamma-alumina catalyst (30 mesh/inch), which was obtained from a process in which ethylene had been polymerized in the presence of the catalyst but in the absence of any activator (hydride) to produce only solid polyethylenes, was employed. The amount of spent molybdena catalyst was 5.0 g. and 0.5 g. of $LiAlH_4$ were employed as the activating agent. Xylenes in the amount of 50 cc. were employed as the liquid reaction medium. The mixture was heated with stirring in the 100 cc. reaction bomb to 230° C. and ethylene then was pressured into the bomb to an initial pressure of 900 p. s. i. g. A total ethylene pressure drop of 1065 p. s. i. g. was obtained in 60 minutes, at which time the reactor became full of ethylene polymer, causing the stirring mechanism to jam. The reactor was then cooled, opened, and it was found that ethylene polymer was produced in the proportion of 0.75 g. per g. of catalyst. The polyethylene had a specific viscosity $\times 10^5$ of 63,500 and melt viscosity of $9.5 \times 10^7$ poises; it was molded into a tough and flexible film.

Example 3

The reaction bomb was charged with 0.5 g. of 8 weight percent molybdena-gamma-alumina catalyst (60-80 mesh), 0.17 g. of LiAlH$_4$, 50 cc. of xylenes and heated with stirring to a temperature of 229° C., whereupon ethylene was charged into the bomb to an initial pressure of 1070 p. s. i. g. and hydrogen was charged to a partial pressure of 200 p. s. i. In two hours, the total pressure drop in the reactor was 1310 p. s. i. g. As a result of the reaction, a tough, flexible ethylene polymer having a specific viscosity $\times 10^5$ of 25,100 and melt viscosity of $3.15 \times 10^6$ poises was produced in the proportion of 1.18 g. per g. of catalyst, together with a small proportion of a grease-like ethylene polymer.

Example 4

The charge was 0.5 g. of 8 weight percent molybdena-alumina catalyst, 0.07 g. of LiAlH$_4$ and 50 cc. of xylenes. The ethylene charging stock contained 0.02 to 0.03 mol percent of CO$_2$. Ethylene was pressured into the 100 cc. reactor when it had reached 233° C. An ethylene pressure drop of 1430 p. s. i. g. was observed over a period of 3 hours. The reaction yielded 4.84 g. per g. of catalyst of a polyethylene having a specific viscosity $\times 10^5$ of 29,200, melt viscosity of $2.3 \times 10^6$ poises, capable of yielding a tough and flexible film. Analysis of the off-gas indicated 0.01 volume percent CO$_2$. The proportion of grease-like polyethylene was 0.60 g. per g. of catalyst.

Example 5

Xylenes (50 cc.), 0.14 g. of 8 weight percent molybdena-alumina catalyst and 0.07 g. of LiAlH$_4$ were charged to the 100 cc. reactor, which was heated with stirring to 230° C. and a purified ethylene was then charged to the initial pressure of 780 p. s. i. g. which was maintained by intermittent ethylene injection over the reaction period of 250 minutes. The reaction yielded 9.43 g. per g. of catalyst of a normally solid ethylene polymer having a specific viscosity $\times 10^5$ of 50,500, melt viscosity of $3.2 \times 10^7$ poises, which could be molded into a tough and flexible film. It will be noted that the solvent:catalyst ratio was about 350 cc./g.

Example 6

The reactor was charged with 0.4 g. of 8 weight percent molybdena-alumina catalyst, 0.06 g. of LiAlH$_4$, 50 cc. of xylenes, heated with stirring to 230° C. and ethylene was pressured into the reactor to an initial pressure of 1040 p. s. i. g., the reactor being repressured from time to time with ethylene to maintain the reaction pressure. The total operating period was about 4 hours. The reaction yielded 10.3 g. per g. of catalyst of a solid polyethylene having a specific viscosity $\times 10^5$ of 31,000, melt viscosity of $4.5 \times 10^6$ poises, capable of being molded into a tough and flexible film.

Example 7

The reactor was charged with 5 g. of 60-80 mesh molybdena-gamma-alumina catalyst containing 8 weight percent molybdena, 0.5 g. of LiAlH$_4$, and 50 cc. of isooctane. The reactor was heated with stirring to 232° C. and propylene was then charged to maintain a partial propylene pressure of between 600 and 1000 p. s. i. therein. A total propylene pressure drop of 875 p. s. i. occurred over the reaction period of 356 minutes. A tough, flexible propylene polymer having a specific viscosity ($\times 10^5$) of 11,700 was produced, having a CH$_2$/CH$_3$ of 8.0, together with some grease-like propylene polymers.

Example 8

The 100 cc. reactor was charged with 0.3 g. of 60-80 mesh molybdena-gamma-alumina catalyst containing 8 weight percent molybdena, 0.06 g. of LiAlH$_4$ and 50 cc. of xylenes. The reactor was heated with stirring to 230° C. and ethylene was then pressured into the reactor to a partial pressure of about 1000 pounds, the ethylene pressure being maintained by introducing additional quantities thereof as it polymerized. Over the course of 4 hours, the total ethylene pressure drop was 1020 p. s. i. The reaction yielded 6.4 g. per g. of catalyst of a solid ethylene polymer having a specific viscosity ($\times 10^5$) of 14,000 and melt viscosity of $8.0 \times 10^5$ poises. The solid ethylene polymer was molded into a tough and flexible film.

Example 9

The reactor was charged with 0.42 g. of 60-80 mesh molybdena-gamma-alumina catalyst containing 8 weight percent molybdena, 0.12 g. LiAlH$_4$ and 150 ml. of specially purified xylenes. The volume of the reactor was 250 ml. The reactor was heated with stirring to 233° C., after which ethylene was pressured into the reactor to an initial pressure of 1000 p. s. i. g. which was maintained by the addition of ethylene as it was consumed in the polymerization process. The reaction yielded 19 g. of solid ethylene polymer per g. of catalyst and 0.83 g. of grease-like ethylene polymer per g. of catalyst. The specific viscosity ($\times 10^5$) of the solid ethylene polymer was 14,400 and its melt viscosity was $4.4 \times 10^5$ poises.

Example 10

The 100 cc. reactor was charged with 0.14 g. of 60-80 mesh molybdena-gamma-alumina catalyst containing 8 weight percent molybdena, 0.04 g. LiAlH$_4$ and 50 cc. of purified xylenes. Dehydrated and decarbonated ethylene was charged to the reactor after the contents had been heated to 230°C. to produce an initial partial ethylene pressure of 900 p. s. i. g. Reaction was continued for 360 minutes. A solid polyethylene having a specific viscosity ($\times 10^5$) of 12,400 and melt viscosity of $3.9 \times 10^4$ poises was produced in the yield of 36.2 g. per g. of catalyst, together with 3.14 g. per g. of catalyst of a grease-like ethylene polymer.

Example 11

The 250 cc. reactor was charged with 5 g. of a commercial catalyst containing 31 weight percent of chromia dispersed on gamma-alumina (30-100 mesh) which had been partially reduced by treatment with dry hydrogen at atmospheric pressure for 16 hours at 375° C. In addition, the reactor was charged with 0.5 g. of LiAlH$_4$ and 100 cc. of purified xylenes and the contents were stirred and heated to 230°C. under slight hydrogen pressure. Dehydrated and decarbonated ethylene was then injected into the reactor to an initial partial ethylene pressure of 920 p. s. i. g. The reaction yielded 1.85 g. of a solid ethylene polymer having a density (24° C.) of 0.976.

Example 12

The 250 cc. reactor was charged with 2 g. (30-100 mesh) of a tungstia-zirconia catalyst containing 20 weight percent of WO$_3$, which was partially reduced by treatment with dry hydrogen and atmospheric pressure at 450° C. for 16 hours. In addition, 100 cc. of purified xylenes and 0.3 g. of LiAlH$_4$ were charged and heated with stirring under a slight hydrogen pressure to 255° C.

Dehydrated and decarbonated ethylene was then charged to an initial pressure of 875 p. s. i. g. and reaction was continued for 10 hours with intermittent injection of ethylene into the reactor. The operation yielded 2.78 g. per g. of catalyst of a solid ethylene polymer which was molded into a tough and flexible film. The polymer was characterized by a specific viscosity ($\times 10^5$) of 18,800, melt viscosity of $2 \times 10^5$ poises and density at 24° C. of 0.952.

*Example 13*

The 100 cc. reactor was charged with 1 g. of 8 weight percent molybdena supported on gamma-alumina, employed in the form of a filter cake of 20–80 mesh/inch size. Before use the catalyst was reduced with dry hydrogen at atmospheric pressure and 480° C. for a period of 16 hours. The reactor was also charged with 0.2 g. of $NaAlH_4$ and 50 cc. of purified xylenes. The contents of the reactor were heated with stirring to 250° C. and ethylene was then pressured into the reactor to an initial partial pressure of 860 p. s. i. Reaction was continued for a period of 20 hours, over the course of which ethylene was intermittently repressured into the reactor; the total ethylene pressure drop was 640 p. s. i. The operation yielded 1.45 g. per g. of catalyst of a solid ethylene polymer which was molded into a tough and flexible film. The solid polymer had a melt viscosity of $4.8 \times 10^5$ poises and density at 24° C. of 0.963.

*Example 14*

The 100 cc. reactor was charged with 5 g. of 8 weight percent molybdena supported on gamma-alumina, employed in the form of 60–80 mesh powder, and with 0.5 g. $LiAlH_4$. The liquid propylene (70 cc.) was added to the reactor and reaction was effected at 187° C. and initial propylene pressure of 3100 p. s. i. g. The total propylene pressure drop was 635 p. s. i. g. In this operation, in which no liquid reaction medium was employed, 0.2 g. per g. of a soft propylene polymer was produced having a specific viscosity ($\times 10^5$) of 10,000.

In lieu of, or in addition to, the alkali metal aluminum hydride promoters, we may employ other metal aluminum hydrides such as alkaline earth metal aluminum hydrides, particularly $Ca(AlH_4)_2$ and $Mg(AlH_4)_2$.

We may employ group $5a$ metal oxide catalysts in lieu of the group $6a$ metal oxides in our process, viz., oxides of vanadium, columbium and tantalum, the process remaining otherwise unchanged in all essential regards. The variant process employing said group $5a$ metal oxide catalysts is described and claimed in our application for United States Letters Patent, Serial No. 373,684, filed August 11, 1953.

The polymers produced by the process of this invention can be subjected to such after-treatment as may be desired, to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylene and/or in by-product alkylates or "greases." The polyethylenes may be employed as coating materials, binders, etc. to even a wider extent than polyethylenes made by prior processes.

The polymers produced by the process of the present invention, especially the polymers having high specific viscosities, can be blended with the lower molecular weight polyethylenes to impart stiffness or other desired properties thereto. The solid resinous products produced by the process of the present invention can, likewise, be blended in any desired proportions with hydrocarbon oils, waxes such as paraffin or petroleum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about one liter of xylenes at a temperature close to the boiling point produced an extremely viscous solution.

The polymers produced by the present process can be subjected to chemical modifying treatments, such as halogenation, halogenation followed by dehalogenation, sulfohalogenation by treatment with sulfuryl chloride, sulfonation, and other reactions to which hydrocarbons may be subjected.

Having thus described our invention, what we claim is:

1. In a process for the production of a polymeric hydrocarbon material having a molecular weight of at least 300, the steps of contacting a normally gaseous olefin selected from the class consisting of ethylene, propylene and mixtures containing ethylene and propylene with a catalytic mixture prepared by admixing an alkali metal aluminum hydride with an oxide of a metal of group $6a$ of the Mendeleeff Periodic Table supported upon a difficultly reducible metal oxide at a reaction temperature between about 130° C. and about 325° C., and separating a polymeric hydrocarbon material having a molecular weight of at least 300 thus produced.

2. In a process for the production of a normally solid ethylene polymer, the steps of contacting ethylene with a catalytic mixture prepared by admixing an alkali metal aluminum hydride with an oxide of a metal of group $6a$ of the Mendeleeff Periodic Table supported upon a difficultly reducible metal oxide, effecting said contacting in the presence of a liquid hydrocarbon reaction medium at a reaction temperature between about 130° C. and about 325° C., and separating a normally solid ethylene polymer thus produced.

3. The process of claim 2 wherein said liquid hydrocarbon reaction medium is a saturated hydrocarbon.

4. The process of claim 2 wherein said liquid hydrocarbon reaction medium is a monocyclic aromatic hydrocarbon.

5. The process of claim 2 wherein said hydride is $LiAlH_4$.

6. The process of claim 2 wherein said hydride is $NaAlH_4$.

7. In a process for the production of a normally solid, resinous hydrocarbon material, the steps of contacting ethylene with a catalytic mixture prepared by admixing an alkali metal aluminum hydride with an oxide of a metal selected from the group consisting of chromium, molybdenum and tungsten supported upon a difficultly reducible metal oxide, effecting said contacting in the presence of a liqiud hydrocarbon reaction medium at a reaction temperature between about 130° C. and about 325° C. and a reaction pressure of at least about 200 p. s. i. g., and separating a normally solid, resinous hydrocarbon material thus produced.

8. In a process for the production of a normally solid, resinous hydrocarbon material, the steps which comprise contacting ethylene in a concentration between about 2 weight percent and about 10 weight percent in a liquid hydrocarbon reaction medium with a catalytic mixture prepared by admixing an alkali metal aluminum hydride with a catalyst comprising essentially a minor proportion of an oxide of a metal selected from the group consisting of chromium, molybdenum and tungsten supported upon a major proportion of a difficulty reducible metal oxide, the ratio of alkali metal aluminum hydride to metal oxide catalyst being between about 0.005 and about 2 by weight, at a temperature between about 130° C. and about 325° C. and a pressure between about 200 and about 5000 p. s. i. g., and separating a normally solid, resinous hydrocarbon material thus produced.

9. The process of claim 8 wherein the hydride is lithium aluminum hydride, the liquid reaction medium is an aromatic hydrocarbon and the metal oxide is molybdenum oxide supported on alumina.

10. In a process for the production of a propylene polymer having a molecular weight of at least 300, the steps which comprise contacting propylene in a liquid hydrocarbon reaction medium with a catalytic mixture prepared by admixing an alkali metal aluminum hydride with an oxide of a metal of group 6a of the Mendeleeff Periodic Table supported upon a difficultly reducible metal oxide at a reaction temperature between about 200° C. and about 300° C., and separating said propylene polymer thus produced.

11. A process for the preparation of a resinous copolymer from ethylene and propylene, which process comprises contacting ethylene and propylene in a molar ratio between about 0.1 and about 10 with a liquid hydrocarbon reaction medium and a catalytic mixture prepared by admixing an alkali metal aluminum hydride with a solid material comprising a major proportion of a difficultly reducible metal oxide and a minor proportion of partially pre-reduced molybdenum trioxide at a temperature between about 130° C. and about 325° C., and separating a normally solid polymerization product thus produced.

12. A process for the preparation of a tough, resinous, hydrocarbonaceous material from ethylene and propylene, which process comprises contacting ethylene and propylene in a molar ratio between about 0.1 and about 10 with decalin, and a catalytic mixture prepared by admixing LiAlH$_4$ with a gamma-alumina supported, partially pre-reduced molybdenum trioxide having an average valence state between about 3 and about 5, the weight ratio of said LiAlH$_4$ to said supported molybdenum trioxide being between about 0.005 and about 2, at a temperature between about 130° C. and about 325° C., and separating a tough, resinous, hydrocarbonaceous material thus produced.

13. A process for the production of a normally solid hydrocarbon material which comprises the steps of contacting propylene with a catalytic mixture prepared by admixing an alkali metal aluminum hydride with an oxide of a metal of group 6a of the Mendeleeff Periodic Table supported upon a difficultly reducible metal oxide, effecting said contacting in the presence of a liquid hydrocarbon reaction medium at a reaction temperature between about 130° C. and about 325° C., and separating a normally solid hydrocarbon material thus produced.

14. The process of claim 13 wherein said alkali metal aluminum hydride is lithium aluminum hydride.

15. The process of claim 13 wherein said alkali metal aluminum hydride is lithium aluminum hydride and said oxide is a minor proportion of a molybdenum oxide supported upon a major proportion of a difficultly reducible metal oxide.

References Cited in the file of this patent

UNITED STATES PATENTS

| | | |
|---|---|---|
| 2,385,609 | Clark | Sept. 25, 1945 |
| 2,691,647 | Field et al. | Oct. 12, 1954 |